Nov. 25, 1941.     T. MADLAND     2,264,088
CAR DOOR
Filed June 4, 1938
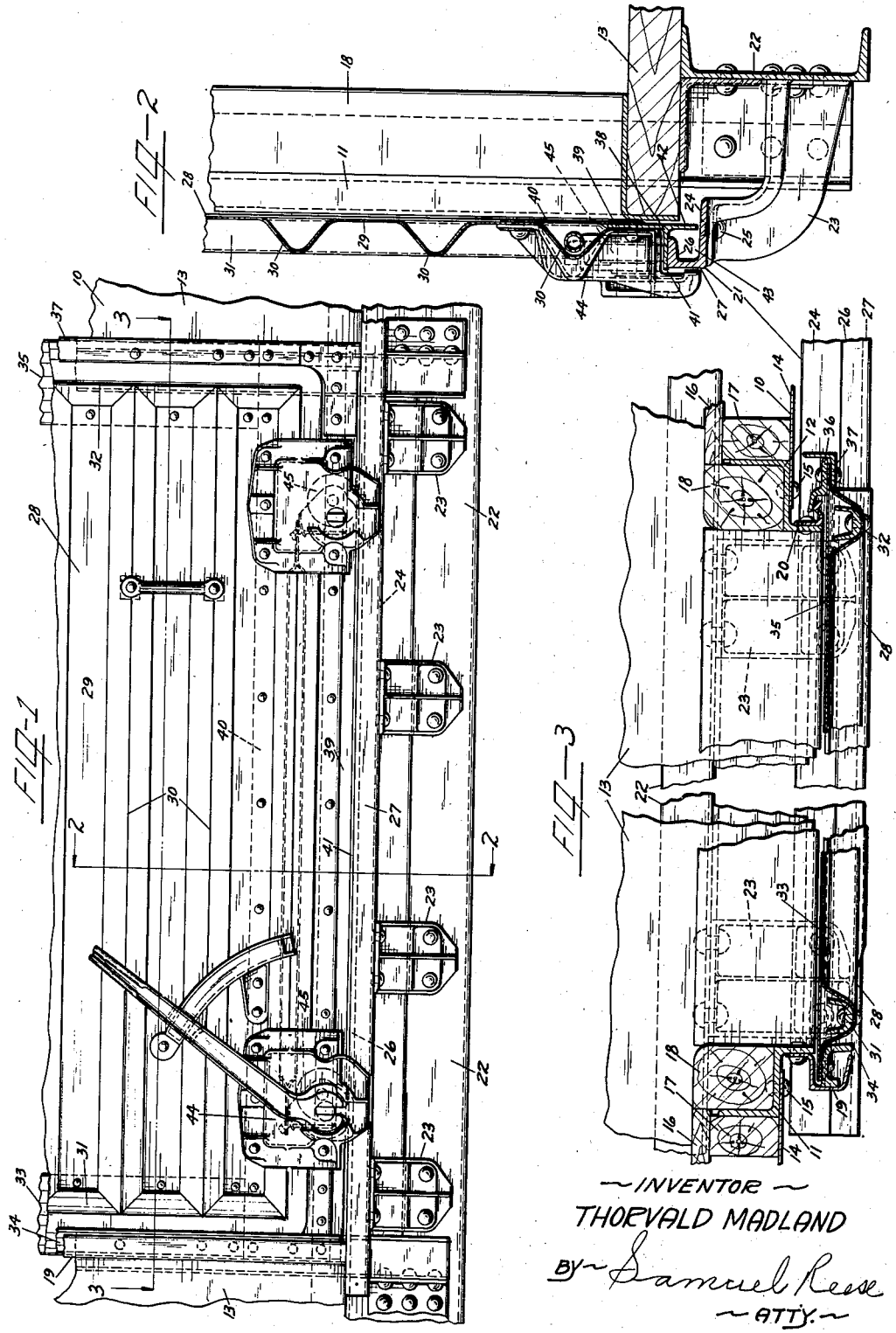
INVENTOR
THORVALD MADLAND
BY Samuel Reese
ATTY.

Patented Nov. 25, 1941

2,264,088

UNITED STATES PATENT OFFICE 2,264,088

CAR DOOR

Thorvald Madland, Chicago, Ill., assignor to The Youngstown Steel Door Company, Cleveland, Ohio, a corporation of Ohio Application June 4, 1938, Serial No. 211,884

2 Claims. (Cl. 20—22)

This invention relates to car doors and is concerned more particularly with the construction at the lower margins of the doors and their association with supporting tracks.

This invention has for its objects the provision of bottom hung sliding doors for railway house cars and supporting tracks therefor wherein the doors are so constructed and the tracks so disposed and associated with the doors that ingress of dirt, snow, cinders, rain and the like into the cars at the bottom of the door openings is substantially eliminated; the provision of bottom hung sliding doors and supporting tracks disposed and related to secure longitudinally extending baffles and pockets below the bottom of car door openings, effectively preventing ingress of foreign matter into the cars; the disposition of a supporting track for bottom hung sliding doors whereby the track may be secured to supporting brackets by vertical rivets and provide a substantial horizontal surface other than that secured to the brackets upon which door rollers are adapted to travel; the disposition of a track for bottom hung sliding doors whereby resistance to deflection is increased; the provision of a supporting track for bottom hung sliding lift doors wherein the track presents inwardly directed horizontal flanges connected by a vertical flange, the track flanges cooperating with a door flange to form a weather pocket and one of the horizontal flanges constituting a tread for door rollers and a frictional door support; and the provision of a supporting track for bottom hung sliding doors, the track being of such construction that supporting brackets therefor may be disposed directly beneath the door rollers and the track may cooperate with the doors to provide longitudinally extending weather pockets.

Other objects of the invention will become clear as the description thereof proceeds.

In the drawing forming part of this specification:

Figure 1 is a fragmentary elevation of a railway car side including a sliding door and door track embodying the instant invention.

Figure 2 is a vertical section taken on line 2—2 of Figure 1, and

Figure 3 is a broken horizontal section taken on line 3—3 of Figure 1.

In the drawing the reference numeral 10 designates a side wall of a railway house car. The side wall 10 embodies front and rear door posts 11 and 12 which together with a car floor 13 define in part a door opening provided in the car side. Metallic sheathing 14 is secured to the door posts as by means of rivets 15. The car side includes inner wooden lining 16 spaced from the metallic sheathing by means including timbers 17 to which the lining is secured as by means of nails. Wooden nailing timbers 18 are positioned in the inwardly extending reentrant angles provided by the door posts. A front stop member 19 is secured to the front door post 11 and a spark and sealing strip 20 fastened to the rear door post 12.

Below the door opening above defined there is disposed a longitudinally extending track 21 supported from the side sill 22 by means of a plurality of track brackets 23. As more clearly appears in Figure 2 of the drawing, the track 21 embodies an inwardly directed flange 24 secured as by means of vertical rivets 25 to the track brackets 23. The track 21 includes an upper inwardly extending flange 26 spaced from the flange 24 by the vertical connecting web 27.

A sliding door 28 illustrated as of the lift type is adapted to be supported upon the track 21. The door 28 which is shown for illustrative purpose is a metallic door formed of a metallic panel 29 provided with spaced horizontal corrugations 30 which at their ends merge into vertical corrugations 31 and 32. The front margin of the metallic panel 29 is reinforced by means of a backing plate 33 extending across and secured to the panel on opposite sides of the vertical corrugation 31 and by a marginal stiffener 34 which cooperates with the front stop 19 to provide a weather proof construction for the front edge of the door. The rear vertical margin of the panel is reinforced by means of a backing plate 35 and carries a sealing strip 36 adapted to cooperate with the spark strip 20 for weather proofing purposes, and a buffer angle 37. The upper margin of the door, not shown, is also suitably reinforced.

The bottom horizontal margin of the door is reinforced by means of a metallic member which in the embodiment of the invention illustrated takes the form of a T-shaped member 38. This member is disposed so that one of its flanges 39 extends vertically and is secured to the lower margin of the panel and to a backing plate 40 fastened to the panel and extending across the lowermost horizontal corrugation 30. The stem 41 of the reinforcing T member extends outwardly in overlapping relationship to the inwardly directed flange 26 of the track 21. The remaining vertical flange 42 of the T member extends downwardly from the stem 41 in proximity to the inwardly directed flange 24 of the track.

With reference to Figure 2 of the drawing it will be observed that the depending flange 42 of the bottom reinforcing T member is so disposed as to cooperate with the inwardly directed flanges 24 and 26 and the vertical connecting web 27 of the door track 21 to provide a longitudinally extending weather pocket 43 for effectively preventing the ingress of foreign matter into the car at the bottom of the door opening formed therein. Additionally it will be observed that the lower inwardly directed flange 24 of the door track extends across the flange 42 so as to lie below the floor 13 of the car. The inwardly directed flange 24 thus provides an effective baffle preventing the ingress of foreign matter into the car.

As the door illustrated is of the lift type, lift mechanism indicated in its entirety by the reference numeral 44 is provided. In this type of door frictional seating is secured at all times except when the door is being moved between open and closed positions. For this purpose the outwardly directed stem 41 of the T member is utilized, this stem being adapted to engage the inwardly directed flange 26 of the track to provide the frictional engagement above mentioned. Rollers 45 of the lift mechanism 44 become effective when the door is elevated to support it antifrictionally for longitudinal movement along the track. These rollers are supported upon the inwardly directed flange 26 of the track during the movement of the door. By virtue of the disposition of the track the brackets 23 are disposed so as to lie vertically below the door rollers as is clearly illustrated in Figure 2 of the drawing.

It will be apparent that numerous changes and modifications in the details of the invention will be clear to those skilled in the art. It is intended, therefore, that all such modifications and changes be comprehended within this invention, which is to be limited only by the scope of the claims appended hereto.

I claim:

1. In a railway house car having a side sill, a door opening and a floor projecting outwardly beyond said side sill in said door opening, a track disposed below and extending continuously across said door opening, said track consisting of upper and lower inwardly directed flanges and a vertical web connecting said flanges, brackets secured to said side sill and said lower flange for supporting said track, said brackets being spaced vertically below said upper flange and a sliding door supported upon said track, said door having rollers engaging said upper flange and a depending flange having a length at least substantially equal to the width of said door opening, said depending flange cooperating with said inwardly directed flanges and vertical web of said track when said door is closed to provide a longitudinally extending weather pocket.

2. In a railway house car having a side sill, a door opening and a floor projecting outwardly beyond said side sill in said door opening, a track disposed below and extending continuously across said door opening, said track consisting of upper and lower inwardly directed flanges and a vertical web connecting said flanges, brackets secured to said sill and said lower flange for supporting said track, said brackets being spaced vertically below said upper flange and a sliding door supported upon said track, said door having rollers engaging said upper flange and a depending flange having a length at least substantially equal to the width of said door opening, said depending flange cooperating with said inwardly directed flanges and web of said track when said door is closed to provide a longitudinally extending weather pocket, said lower track flange extending inwardly below said depending flange in proximate relation thereto and across the space between said door and said floor.

THORVALD MADLAND.